US009534926B2

(12) United States Patent
Roberfroid et al.

(10) Patent No.: US 9,534,926 B2
(45) Date of Patent: Jan. 3, 2017

(54) METHOD FOR THE AUTONOMOUS CALIBRATION OF AN INERTIAL RIG USED IN STATIC MODE

(71) Applicant: Sagem Defense Securite, Boulogne-Billancourt (FR)

(72) Inventors: David Roberfroid, Boulogne-Billancourt (FR); Vincent Cournou, Boulogne-Billancourt (FR)

(73) Assignee: SAGEM DEFENSE SECURITE, Boulogne-Billancourt (FR)

( * ) Notice: Subject to any disclaimer, the term of this patent is extended or adjusted under 35 U.S.C. 154(b) by 0 days.

(21) Appl. No.: 14/895,478

(22) PCT Filed: Jun. 2, 2014

(86) PCT No.: PCT/EP2014/061354
§ 371 (c)(1),
(2) Date: Dec. 2, 2015

(87) PCT Pub. No.: WO2014/195259
PCT Pub. Date: Dec. 11, 2014

(65) Prior Publication Data
US 2016/0109260 A1  Apr. 21, 2016

(30) Foreign Application Priority Data

Jun. 3, 2013 (FR) ..................................... 13 01248

(51) Int. Cl.
*G01P 21/00* (2006.01)
*G01C 25/00* (2006.01)
(Continued)

(52) U.S. Cl.
CPC .............. *G01C 25/005* (2013.01); *G01C 19/38* (2013.01); *G01C 21/165* (2013.01); *G01P 21/00* (2013.01)

(58) Field of Classification Search
None
See application file for complete search history.

(56) References Cited

U.S. PATENT DOCUMENTS 6,401,036 B1    6/2002  Geier et al.
2009/0089001 A1  4/2009  Lin
(Continued)

OTHER PUBLICATIONS

International Search Report with English Language Translation, dated Sep. 11, 2014, Application No. PCT/EP2014/061354.
(Continued)

*Primary Examiner* — Robert R Raevis
(74) *Attorney, Agent, or Firm* — Blakely Sokoloff Taylor & Zafman LLP

(57) ABSTRACT

The invention relates to a method for the autocalibration of an inertial rig comprising an inertial core defining a sensor reference frame, implemented in the course of at least two missions ($M_n$, $M_{n+1}$) each comprising the determination, on the basis of measurements of gyroscopes, of the orientation of the rig in a reference frame comprising the north axis (N) and the vertical axis (Up), the method comprising the implementation:—in the course of a mission ($M_n$), of an estimation (200) of drift errors of the gyroscopes for the orientation of the rig at least with respect to the north axis (dgyrN); and—in the course of a following mission ($M_{n+1}$), of a calculation (400) of corrections of drift errors ($DX_n$) of the sensor reference frame (X,Y,Z), on the basis of the estimated drift errors; and—of a calculation (600) of drift errors ($X_{n+1}$), consisting in correcting drift errors ($X_n$) of the sensor reference frame that were calculated during the previous mission ($M_n$).

11 Claims, 2 Drawing Sheets

Figure 1:
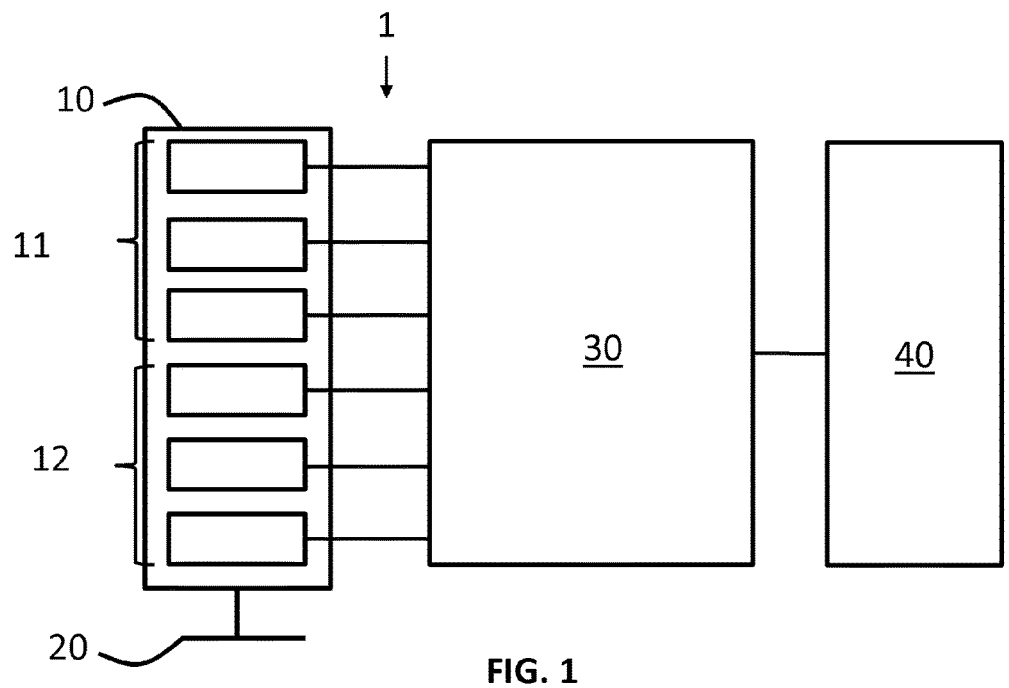

(51) Int. Cl.
*G01C 19/38* (2006.01)
*G01C 21/16* (2006.01)

(56) References Cited

U.S. PATENT DOCUMENTS

2011/0285623 A1\* 11/2011 Ye .......................... G06F 3/0346
345/158
2012/0259572 A1   10/2012 Afzal et al.

OTHER PUBLICATIONS

French Search Report and Written Opinion, dated Mar. 25, 2014, French Application No. 1301248.

\* cited by examiner

METHOD FOR THE AUTONOMOUS CALIBRATION OF AN INERTIAL RIG USED IN STATIC MODE

FIELD OF THE INVENTION

The field of the invention is that of inertial equipment used for orientation of mobile systems, including inertial navigation units.

The invention relates to the autonomous calibration of such inertial equipment, also called auto-calibration.

PRIOR ART

Inertial navigation units serve especially to locate and orient terrestrial vehicles. In this respect they comprise inter alia a chassis fixed to the user system, a computer, memory and an inertial core rigidly mounted ("strap-down") relative to the chassis. The inertial core comprises inertial sensors such as accelerometers and gyroscopes (or gyrometers to be assimilated in gyroscopes subsequently), which define axes of a sensor reference frame.

Gyroscopes measure the angular rotations of the core according to the three axes of the sensor reference frame.

Accelerometers measure the specific forces of the core according to the three axes of the sensor reference frame.

In the alignment phase called "gyrocompass", the accelerometers determine the horizontal plane by determining the direction of the gravity vector (determination of roll and pitch), and gyroscopes determine the orientation of the sensor reference frame relative to the North (determination of the heading) by measuring terrestrial rotation.

Beyond this phase, measurements of gyroscopes allow retaining the orientation of a calculation reference frame in which the measurements of the accelerometers are projected and integrated to produce the speed and the variation in position.

The precision of an inertial navigation unit depends on the precision of the inertial sensors and the precision of their projection in the integration marker, the latter also being dependent on the precision of the inertial sensors.

The precision of the gyroscopes can be affected by drift errors due to ageing of the latter. A drift error of a gyroscope is an offset at the origin of the measurement, implying that a zero magnitude (in this case zero rotation) is not measured at zero.

Inertial units installed in different systems, vehicles terrestrial in particular, are frequently used during short missions, of the order of a few hours, comprising shifts and changes of the perceived orientation.

During these missions, frequent changes in orientation, with the help of external observation, decorrelate the drift errors of the gyroscopes of the information they supply and can therefore correct this information.

However, inertial units are also used as permanent gyrocompass, that is, as tools for determining the horizontal plane (roll and pitch of the system) and the axis of the geographic North (heading of the system) during longer missions, of the order of a few days to a few months based on external information on speed or position. If the systems, and therefore the inertial units, are quasi-static during these long-term missions the very slight shifts and variations in orientation to which they are subjected do not decorrelate the drift errors of the gyroscopes of information they supply. This scope of use can be in particular encountered on terrestrial equipment.

Other inertial equipment, simpler than an inertial unit, is also capable of providing the heading in a static case. This is the case of equipment fitted only with 2 accelerometers (or inclinometers) and 3 gyroscopes or more simply equipment with two gyroscopes and a system for positioning these gyroscopes in the horizontal plane.

Document US2012/0259572 discloses a method for correction of drift errors of a gyroscope from measurements, at two separate times of use of the gyroscope, of the vector of the Earth's magnetic field. However this document does not exploit the estimation of drift errors on the orientation of inertial equipment relative to geographic North to determine the drift error of the sensor reference frame.

PRESENTATION OF THE INVENTION

The aim of the invention is to eliminate the above lack.

In particular, the aim of the invention is to propose an autonomous calibration method of inertial equipment to compensate drift errors linked to equipment sensors.

Another aim of the invention is to propose inertial equipment having improved and long-term precision on the delivered heading precision relative to the prior art.

In this respect, according to a first aspect the invention proposes a calibration method of inertial equipment comprising an inertial core forming a sensor reference frame, said core comprising at least two gyroscopes,
the method being executed during at least two successive missions of the inertial equipment, each mission comprising determining from measurements of gyroscopes the orientation of the equipment in a geographic reference frame comprising the axis of the North and the axis of the vertical, the positions relative of the sensor reference frame and of the geographic reference frame being different from one mission to the other,
the method being characterized by performing:
 during a mission of the equipment, estimation of drift errors of the gyroscopes on the orientation of the equipment at least relative to the axis of the North, and
 during a subsequent mission calculation of error drift corrections of the sensor reference frame from drift error estimates on the orientation of the equipment, and
 calculation of drift errors of the sensor reference frame consisting of correcting, by means of said drift error corrections of the sensor reference frame, the drift errors of the sensor reference frame having been calculated during the preceding mission.

The invention is advantageously completed by the following characteristics, taken singly or in any of their technically possible combinations:
 the inertial equipment is an inertial unit whereof the inertial core comprises three accelerometers and three gyroscopes, the estimation step of drift errors of the gyroscopes further comprising estimation of drift errors of the gyroscopes relative to the axis of the vertical.
 calculation of drift error corrections of the sensor reference frame is performed by means of a Kalman filter.
 estimation of the drift errors of the gyroscopes is performed at a predetermined frequency and calculation of the drift error corrections is performed from estimations of averaged drift errors.
 The method further comprises, prior to each step for calculation of drift errors of the sensor reference frame, determining the standard deviation of drift error corrections of the sensor reference frame for each axis of the sensor reference frame, and calculation of drift errors of the sensor reference frame for an axis is performed if the standard deviation of the correction of drift errors of the corresponding axis is less than a predetermined threshold.

During the method, the date of each usage session of the inertial equipment is stored, with calculation of correction of drift errors of the sensor reference frame taking into account the temporal evolution of drift errors of the sensor reference frame according to an ageing law linked to the gyroscopes.

determination of the orientation of the inertial equipment in the geographic reference frame from measurements of gyroscopes and estimation of drift errors of the gyroscopes on said orientation are performed by means of a Kalman filter.

The invention also relates to a computer program product comprising code instructions for executing the preceding auto-calibration method when the latter is executed by a computer (30).

The invention further relates to inertial equipment comprising an inertial core forming a sensor reference frame, said inertial core comprising at least two gyroscopes, a memory, and a computer, the inertial equipment being characterized in that the computer is configured to execute the auto-calibration method described previously.

Advantageously, but optionally, the inertial equipment is an inertial unit whereof the inertial core comprises three accelerometers and three gyroscopes.

The invention finally relates to a processing system, comprising inertial equipment comprising an inertial core forming a sensor reference frame, said core comprising at least two gyroscopes, said system further comprising a memory and a computer, adapted to communicate remotely with the inertial equipment, the system being characterized in that the computer is configured to execute the preceding auto-calibration method.

PRESENTATION OF FIGURES

Other characteristics, aims and advantages of the invention will emerge from the following description which is purely illustrative and non-limiting and which must be considered in light of the appended drawings, in which:

FIG. 1 schematically illustrates inertial equipment according to the invention.

Figure 2:
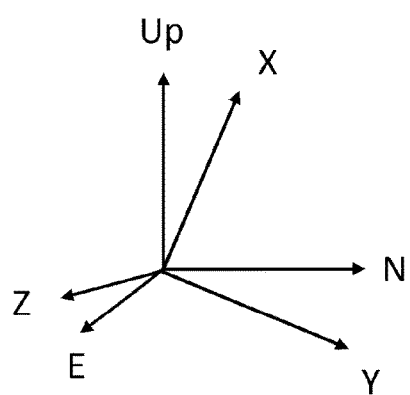
Figure 3:
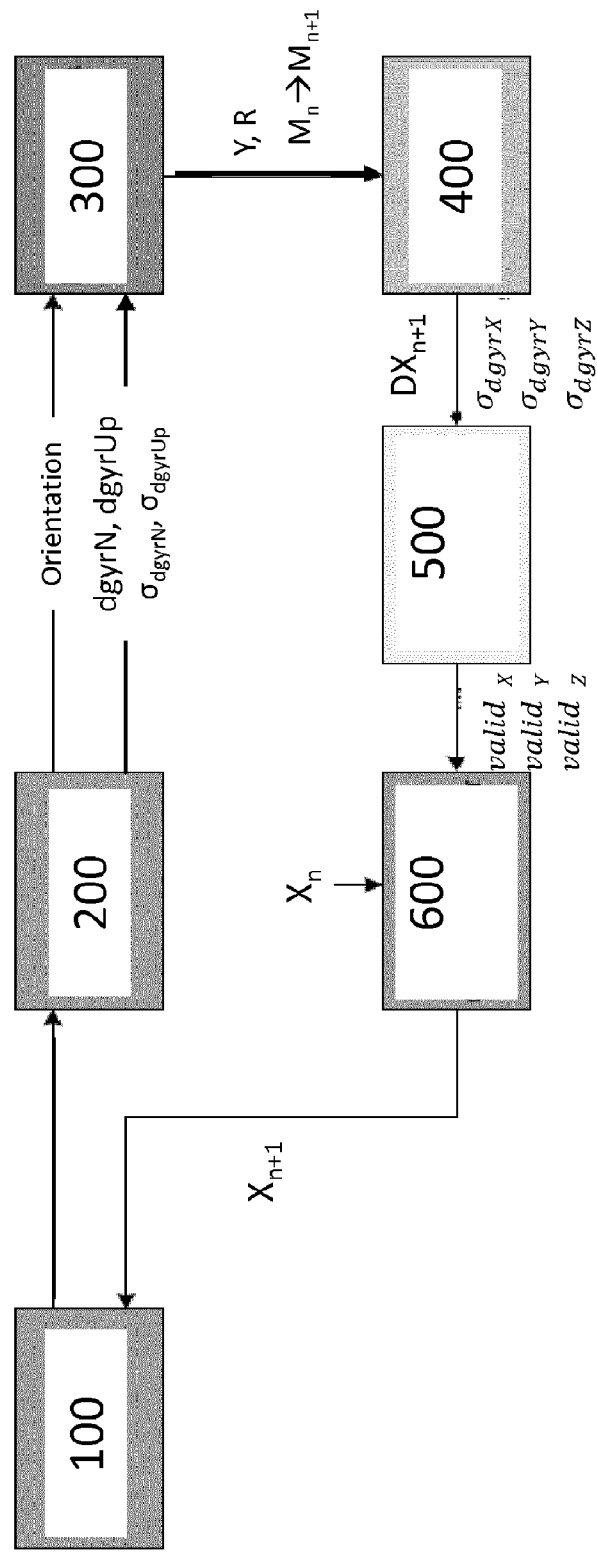

FIG. 2 illustrates an example of relative positions of the sensor reference frame of gyroscopes of inertial equipment and of the geographic reference frame, FIG. 3 illustrates the main steps of the method according to the invention.

DETAILED DESCRIPTION OF AT LEAST ONE EMBODIMENT

FIG. 1 illustrates inertial equipment 1, advantageously an inertial unit, used for the location and orientation of a system on which it is placed. Such inertial equipment comprises an inertial core 10, integral with a chassis 20 intended to be fixed to a system, for example a vehicle, in which the equipment is installed.

The inertial core 10 is defined by three orthogonal axes X, Y, and Z forming the sensor reference frame, and comprises at least two gyroscopes 11, and preferably, in the case of an inertial unit, three gyroscopes 11 capable of measuring rotations around axes X, Y, and Z of the core of the unit relative to an arbitrary fixed inertial frame ($X_i$, $Y_i$, $Z_i$), as well as at least two accelerometers 12, and preferably three accelerometers 12 for measuring the specific forces perceived by the core according to the three axes $X_i$, $Y_i$, $Z_i$ of the fixed inertial frame.

Inertial equipment 1 comprising three gyroscopes 11 can, in the absence of comprising three accelerometers, also comprise two accelerometers or any other device for determining orientation of the axes of gyroscopes relative to the vertical.

In the case of inertial equipment 1 comprising two gyroscopes 11 only, said equipment also comprises a positioning device of the latter in the horizontal plane.

So the different types of inertial equipment are the following:

An inertial unit comprising three gyroscopes and three accelerometers or inclinometers, or Inertial equipment comprising three gyroscopes and two accelerometers or any other device for determining the orientation of axes of gyroscopes relative to the vertical, or Inertial equipment comprising two gyroscopes and a positioning device of the gyroscopes in the horizontal plane.

A computer 30, which can be part of the inertial equipment 1 (as shown in FIG. 1), or alternatively being a processing unit located remotely from said equipment and being provided with communication means with said equipment, receives the results of measurements of the sensors and, from these results, determines orientation of the equipment in a geographic reference frame. This processing of data is known per se and already implemented in many items of inertial equipment.

A memory 40 is also provided for recording calculation data of the computer 30, especially from one mission to another.

FIG. 2 shows an example of relative configuration between the sensor reference frame of gyroscopes of the equipment and the geographic reference frame, which comprises the axis of the vertical Up, the axis of North N, and the axis of East E.

The ageing of gyroscopes causes errors in measurements of rotations of the inertial equipment, which directly impact the data on the orientation of said equipment, by generating offset between relative orientation to the North (Cap) calculated from measurements of sensors and the real orientation of the equipment.

In particular, the drift errors of gyroscopes of axes X, Y and Z of the sensor reference frame result in drifts in the axes of the geographic frame Up (dgyrUp), North (dgyrN) and East (dgyrE), which are linked to some errors in orientation and positioning of the inertial equipment during the gyrocompass phase according to the following equations (equations in absolute value according to the conventions):

$$dgyrE \approx ErrCap*\Omega t*\cos(Lat)$$

$$dgyrN \approx ErrLat*\Omega t*\sin(Lat)$$

$$dgyrUp \approx ErrLat*\Omega t*\cos(Lat)$$

With $\Omega t$: terrestrial rotation value

Lat: latitude of the inertial equipment 1,

ErrCap: heading error of the equipment,

ErrLat: latitude error of the equipment.

The latitude error can be eliminated by providing the position of the equipment, which reveals the drifts in the North and, after a longer observation period, Up axes (hypothesis made in the present case).

However, if the axes of the sensor reference frame are not aligned with the axes of the geographic reference frame, it is not possible to distinguish the different sensor drifts from each other.

Because of this, and in keeping with the method presented in FIG. 3, the data orientation generated during different missions $M_n$, $M_{n+1}$ of the inertial equipment are exploited. The static phase during which alignment of gyrocompass type is conducted is known as mission.

It is supposed that orientation of the inertial equipment differs between missions, especially during two missions for which the relative positions of the sensor reference frame relative to the geographic reference frame are different.

By increasing the drifts relative to the North axis and relative to the Up axis during separate missions (a minimum of two), the drifts of each of the gyroscopes (in the axes X, Y, and Z) can be deduced and corrected to improve the Heading precision provided by the inertial equipment.

For this, the different steps of the auto-calibration method according to the invention will now be described, which comprises conducting auto-calibration filter of drift errors of the gyroscopes described hereinbelow by the computer 30. In this respect, the computer 30 can run a program comprising code instructions for executing this method.

This method is executed during at least two separate missions $M_n$, $M_{n+1}$ a the equipment or of the unit, during which the computer determines orientation of the equipment or the unit from data acquired by the sensors. The relative positions of the sensor reference frame and of the geographic reference frame vary between $M_n$ and $M_{n+1}$.

During each mission $M_n$ a step 100 consists of acquiring the sensors data, especially from the gyroscopes, and applying to them a correction not only originating from data stored and identified at the factory, but also originating from auto-calibration values identified during a preceding mission $M_{n-1}$ by the method described hereinbelow.

During a step 200 the sensors data corrected from step 100 are used to perform a gyrocompass function using filtering performed by the computer, advantageously a Kalman filter.

This Kalman filter estimates the orientation of the Inertial Unit (Heading, Roll and Pitch), a drift error of gyroscopes around the axis of the North N dgyrN, a drift error of gyroscopes around the axis of the vertical Up dgyrUp, as well as the standard deviations $\sigma_{dgyrN}$ and $\sigma_{dgyrUp}$ of drift errors of the gyroscopes respectively relative to the North and relative to the vertical.

These two steps 100 and 200 are currently conducted by an inertial unit 1. In the case of inertial equipment, these steps 100 and 200 are also conducted, with the exception that the drift errors relative to the vertical and the corresponding standard deviation are not calculated.

The computer deduces from this information, during a substep 300, in the case of an inertial unit, an observation vector $Y_n$ of the auto-calibration filter constituted by estimated drift errors, $$Y_n = \begin{pmatrix} \widehat{dgyrN} \\ \widehat{dgyrUp} \end{pmatrix}$$

and on the other hand a noise measurement matrix $R_n$ of the drift errors in sensor axis $$R_n = \begin{pmatrix} \widehat{\sigma^2_{dgyrN}} & \widehat{\sigma^2_{dgyrN,dgyrUp}} \\ \widehat{\sigma^2_{dgyrN,dgyrUp}} & \widehat{\sigma^2_{dgyrUp}} \end{pmatrix},$$

where $\sigma_{dgyrN}^2$ and $\sigma_{dgyrUp}^2$ are respectively the variances in states of drift error of gyroscopes relative to the North and relative to the vertical, and $\sigma_{dgyrN,dgyrUp}^2$ is the covariance between the states of drift error of the gyroscopes relative to the North and relative to the vertical.

In the case of inertial equipment comprising two gyroscopes only, estimations of drift errors of the gyroscopes on the orientation of the equipment are calculated only relative to the axis of the North, the observation vector of the auto-calibration filter is therefore $Y_n = (\widehat{dgyrN})$ and the noise matrix $R_n$ is $R = (\widehat{\sigma^2_{dgyrN}})$.

To constitute the most representative vector $Y_n$ and the matrix $R_n$, the equipment can take the average values over the period of the mission of the drift errors around the axis of the North and around the axis of the vertical, the variances in drift error states of the gyroscopes relative to the North, where needed, and relative to the vertical, and where needed, of the covariance between the drift error states of the gyroscopes relative to the North and relative to the vertical, steps 100 and 200 being iterated at a predetermined frequency.

The matrices $Y_n$ and $R_n$ are recorded in the memory 40. These data must be stored from one mission $M_n$ to the next mission $M_{n+1}$.

The computer 30 also determines a matrix $H_n$ for shifting from the axes of the sensor reference frame to the axes of the North and of the vertical of the geographic frame. This matrix $H_n$ deduced from the EULER angles (Heading, Roll and Pitch), is of the form:

$$H_n = \begin{pmatrix} a_{00} & a_{01} & a_{02} \\ a_{20} & a_{21} & a_{22} \end{pmatrix}$$

This matrix is also recorded in the memory 40.

During a later mission $M_{n+1}$ the aim is to determine and correct the drift of the gyroscopes (and therefore of the sensor reference frame) relative to the preceding mission $M_n$.

During a substep 400, a second dedicated filter, advantageously of Kalman filter type, is responsible for estimating the drift errors in sensors axis ($dgyr_X$, $dgyr_Y$ and $dgyr_Z$) from data stored in step 300 of the preceding mission and its own stored data. For this, it utilises the following elements:

$Y_n$: observation vector originating from step 300 during the preceding mission $M_n$.

$H_n$: observation matrix originating from step 300 during the mission $M_n$.

$R_n$: noise measurement matrix originating from step 300 during the mission $M_n$.

$P_n$: covariance matrix (the diagonal elements being the variances of said drifts and the other elements being the covariances of the drifts between two axes) originating from calculation of the preceding mission $M_n$, of the form $$P_n = \begin{pmatrix} \sigma^2_{dgyrX} & \sigma^2_{dgyrX,dgyrY} & \sigma^2_{dgyrX,dgyrZ} \\ \sigma^2_{dgyrX,dgyrY} & \sigma^2_{dgyrY} & \sigma^2_{dgyrY,dgyrZ} \\ \sigma^2_{dgyrX,dgyrZ} & \sigma^2_{dgyrY,dgyrZ} & \sigma^2_{dgyrZ} \end{pmatrix}$$

Q: state noise matrix $DX_{n+1}$: vector of gyroscopic drift errors state at the current mission n+1:

$$DX_{n+1} = \begin{pmatrix} \delta gyrX \\ \delta gyrY \\ \delta gyrZ \end{pmatrix}.$$

The computer 30 determines the best estimate of gyroscopic drifts by calculating its gain $K_{n+1}$ according to the formula, $$K_{n+1} = (P_n + Q).H_n^T.[H_n.(P_n + Q).H_n^T + R_n]^{-1}$$

and applying it as for any Kalman filter to estimate the new matrix $P_{n+1}$ associated with the new status vector $DX_{n+1}$.

$$P_{n+1} = (I - K_n.H_n).(P_n + Q),$$

$$DX_{n+1} = DX_n + K_{n+1}(Y_n - H_n DX_n)$$

II should be noted that the matrix Q can either depend on the period between two successive steps according to a determined ageing law associated with gyroscopes—in this respect, the dates of the missions M are stored for calculating said period between two successive steps—or be selected constant in the absence of knowledge of time elapsed between two consecutive missions M.

The matrix $P_{n+1}$ and the vector $DX_{n+1}$ are recorded in the memory 40 during step 400 so they can be reused during the later mission $M_{n+2}$.

During a step 500, the computer analyses the precision obtained for each of the estimates of the gyroscopic drift errors to attribute them validity. For this, it compares the standard deviations of the corrections on each axis to a predetermined threshold. These standard deviations correspond to the square roots of the elements of the diagonal of the matrix P.

The computer attributes to the comparison on each axis a corresponding indicator. These three indicators are called ($valid_x$, $valid_y$, $valid_z$). If a standard deviation for an axis is less than the predetermined threshold, the corresponding indicator can take the value 1, the value 0 if not.

During a step 600, the computer 30 corrects the drift errors $X_n$ which had been obtained during the preceding mission $M_n$ by adding the corrections $DX_{n+1}$ determined previously to said drift errors $X_n$ obtained in the preceding step, and this as a function of the value of the indicators.

The new drift values $X_{n+1}$ originating from the auto-calibration method are recorded in the memory 40 during step 600, in view of being used in step 100 of the current acquisition mission $M_{n+1}$ of sensor data, and correction of said data.

The invention claimed is:

1. An auto-calibration method of inertial equipment (1) comprising an inertial core (10) forming a sensor reference frame, said core comprising at least two gyroscopes,
the method being executed during at least two successive missions (Mn, Mn+1) of the inertial equipment (1), each mission being a static phase comprising determination, from measurements of the gyroscopes (11), of the orientation of the equipment (1) in a geographic reference frame comprising the axis of the North (N) and the axis of the vertical (Up), the relative positions of the sensor reference frame (X,Y,Z) and of the geographic reference frame being different from one mission to the other,
the method being characterized by carrying out:
during a mission (Mn) of the equipment (1) estimation (200) of drift errors of the gyroscopes on the orientation of the equipment at least relative to the axis of the North (dgyrN), and
during a following mission (Mn+1) of calculation of drift (400) error corrections (DXn) of the sensor reference frame (X,Y,Z), from drift errors estimated on the orientation of the equipment, and
calculation of drift (Xn+1) errors (600) of the sensor reference frame (X, Y,Z) including correcting by means of said corrections (DXn) of drift errors of the sensor reference frame, the drift errors (Xn) of the sensor reference frame having been calculated during the preceding mission (Mn).

2. The auto-calibration method according to claim 1, the inertial equipment being an inertial unit (1), whereof the inertial core (10) comprises three accelerometers (12) and three gyroscopes (11),
wherein the estimation step (200) of drift errors (dgyrUp, dgyrN) of the gyroscopes further comprises estimation of drift errors of the gyroscopes relative to the axis of the vertical.

3. The auto-calibration method according to claim 1, wherein the calculation (400) of drift (DXn) error corrections of the sensor reference frame (X,Y,Z) is performed by means of a Kalman filter.

4. The auto-calibration method according to claim 1, wherein estimation (200) of the drift errors of the gyroscopes is performed at a predetermined frequency, and calculation (400) of the drift error corrections is performed from estimations of averaged drift errors (300).

5. The auto-calibration method according to claim 1, reference frame comprising prior to each calculation step (600) of drift errors of the sensor reference frame, determination (500) of the standard deviation of drift error corrections (DXn) of the sensor reference frame for each axis of the sensor reference frame, determining that the standard deviation of the correction of drift errors of the corresponding axis is less than a predetermined threshold, and calculation of drift errors (600) of the sensor reference frame for an axis.

6. The auto-calibration method according to claim 1, wherein the date of each usage session of the inertial equipment (1) is stored, the correction calculation of drift errors (400) of the sensor reference frame taking into account the temporal evolution of the drift errors of the sensor reference frame according to an ageing law linked to the gyroscopes (11).

7. The auto-calibration method according to claim 1, wherein determination of the orientation of the inertial equipment in the geographic reference frame from measurements of gyroscopes and estimation (200) of drift errors of gyroscopes on said orientation are carried out by means of a Kalman filter.

8. A computer program product comprising code instructions for executing the calibration method according to claim 1 when the latter is executed by a computer (30).

9. Inertial equipment (1) comprising an inertial core (10) forming a sensor reference frame (X, Y ,Z), said inertial core (10) comprising at least two gyroscopes (11), a memory (40), and a computer (30), the inertial equipment (1) being characterized in that the computer (30) is configured to execute the method according to claim 1.

10. The inertial equipment according to claim 9, said equipment being an inertial unit whereof the inertial core (10) comprises three accelerometers (12) and three gyroscopes (11).

11. A processing system comprising inertial equipment (1) including an inertial core (10) forming a sensor reference frame, said core comprising at least two gyroscopes, said system also comprising a memory (40) and a computer (30), adapted to communicate remotely with the inertial equipment (1), the system being characterized in that the computer is configured to execute the method according to claim 1.

* * * * *